United States Patent
Wells et al.

(10) Patent No.: US 7,924,741 B1
(45) Date of Patent: Apr. 12, 2011

(54) SESSION QUALITY INFORMATION COLLECTION AND CORRELATION

(75) Inventors: Anthony C Wells, Overland Park, KS (US); Stephen Arthur Oliva, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1544 days.

(21) Appl. No.: 11/205,807

(22) Filed: Aug. 17, 2005

(51) Int. Cl.
*H04L 12/28* (2006.01)

(52) U.S. Cl. ...................................... 370/254

(58) Field of Classification Search .................. 370/392, 370/328, 254
See application file for complete search history.

(56) References Cited

U.S. PATENT DOCUMENTS

| | | | |
|---|---|---|---|
| 6,286,047 B1 * | 9/2001 | Ramanathan et al. | 709/224 |
| 6,366,577 B1 * | 4/2002 | Donovan | 370/352 |
| 6,446,127 B1 * | 9/2002 | Schuster et al. | 709/227 |
| 7,330,453 B1 * | 2/2008 | Borella et al. | 370/338 |
| 2002/0036991 A1 * | 3/2002 | Inoue | 370/328 |
| 2002/0172209 A1 * | 11/2002 | Ohta et al. | 370/401 |
| 2003/0120773 A1 * | 6/2003 | Mueller et al. | 709/224 |
| 2004/0109414 A1 * | 6/2004 | Choi et al. | 370/230 |
| 2008/0168172 A1 * | 7/2008 | Keller et al. | 709/227 |

* cited by examiner

*Primary Examiner* — Derrick W Ferris
*Assistant Examiner* — Angel Brockman (57) ABSTRACT

A communication system for collecting and correlating quality information for a session over a path between an origination node and a destination node, the communication system comprising a quality processing system configured to transmit a first subscribe message identifying a first device, and the first device configured to receive the first subscribe message, process first traffic for the session to determine first quality information, and transmit a first quality message indicating the first quality information to the quality processing system responsive to the first subscribe message.

19 Claims, 5 Drawing Sheets

SESSION QUALITY INFORMATION COLLECTION AND CORRELATION

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of telecommunications, and in particular, to systems, methods, and software for collecting and correlating session quality information.

2. Description of the Prior Art

Delivering high quality services in modern packet based telecommunication networks is one of the more difficult challenges facing the telecommunication industry. In the past, services were provided over circuit switched networks. A typical service, such as a voice call, would be connected over a dedicated circuit, thereby allowing for a high level of service quality The distributed nature inherent to packet networks makes past quality of service levels difficult to attain.

One solution in the prior art for measuring and maintaining quality of service is the real-time control protocol (RTCP). RTCP is designed to allow for the monitoring and exchange of quality of service information between devices participating on a service session. For example, an originating phone can exchange RTCP packets with a destination phone during a voice over Internet protocol (VoIP) phone call.

Unfortunately, such prior art solutions do not provide a graceful and dynamic way to deliver quality information to other network elements that do not handle bearer or signaling communications for a session. Furthermore, the distributed nature of packet networks makes it difficult to centrally collect and correlate the vast amounts of quality information that is generated during such sessions.

SUMMARY OF THE INVENTION

An embodiment of the invention helps solve the above problems and other problems by providing methods, systems, and software for delivering quality of service information to any interested network element beyond just those participating on a session. Furthermore, the invention provides for collecting and correlating dispersed quality of service information generated during a session.

An embodiment of the invention includes a communication system for collecting and correlating quality information for a session over a path between an origination node and a destination node, the communication system comprising a quality processing system configured to transmit a first subscribe message identifying a first device, and the first device configured to receive the first subscribe message, process first traffic for the session to determine first quality information, and transmit a first quality message indicating the first quality information to the quality processing system responsive to the first subscribe message.

In an embodiment of the invention, the communication system further comprises a registration system configured to receive a registration notification message from the first device to register the first device, and wherein the quality processing system is further configured to transmit a third subscribe message identifying the registration server and wherein the registration system is further configured to transmit a registration identification message identifying the first device responsive to the third subscribe message.

In an embodiment of the invention, the communication system further comprises a second device wherein the quality processing system is further configured to transmit a second subscribe message identifying the second device and wherein the second device is configured to receive the second subscribe message, process second traffic for the session to determine second quality information, and transmit a second quality message indicating the second quality information to the quality processing system responsive to the second subscribe message.

In an embodiment of the invention, the first device comprises the origination node and wherein the second device comprises the destination node.

In an embodiment of the invention, the first device comprises an intermediate node of the path.

In an embodiment of the invention, the first device comprises a voice over packet enabled end device and wherein the session comprises a voice over packet session.

In an embodiment of the invention, a quality processing system for collecting and correlating quality information for a session over a path between an origination node and a destination node comprises a processing system and an interface. The processing system is configured to generate a third subscribe message identifying a registration server. The interface is configured to transmit the third subscribe message to the registration system and receive a registration identification message from the registration system identifying a first device. The processing system is further configured to process the registration identification message to generate a first subscribe message identifying the first device. The interface is further configured to transmit the first subscribe message to the first device, receive a first quality message indicating first quality information transmitted by the first device responsive to the first subscribe message wherein the first device processes first traffic for the session to determine the first quality information.

BRIEF DESCRIPTION OF THE DRAWINGS

The same reference number represents the same element on all drawings.

DETAILED DESCRIPTION OF THE PREFERRED EMBODIMENT

FIGS. 1-5 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

First Embodiment Configuration and Operation

Figure 1:
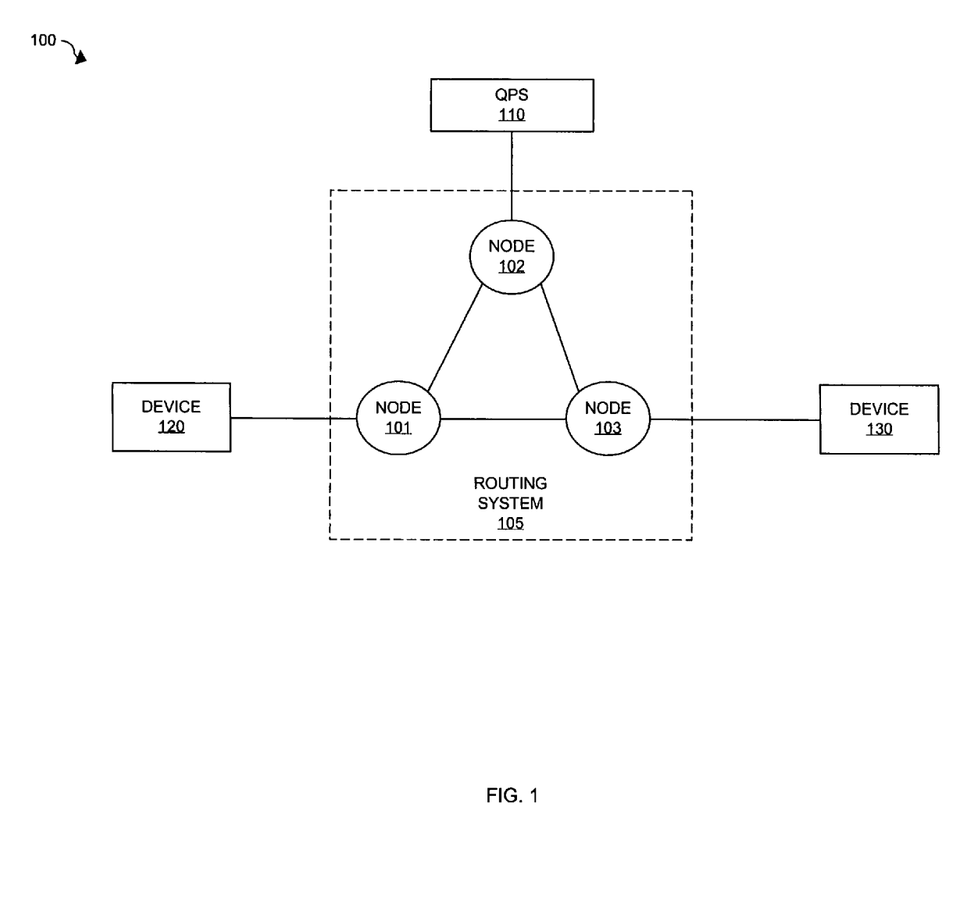
FIG. 1 illustrates a communication system in an embodiment of the invention.
Figure 2:
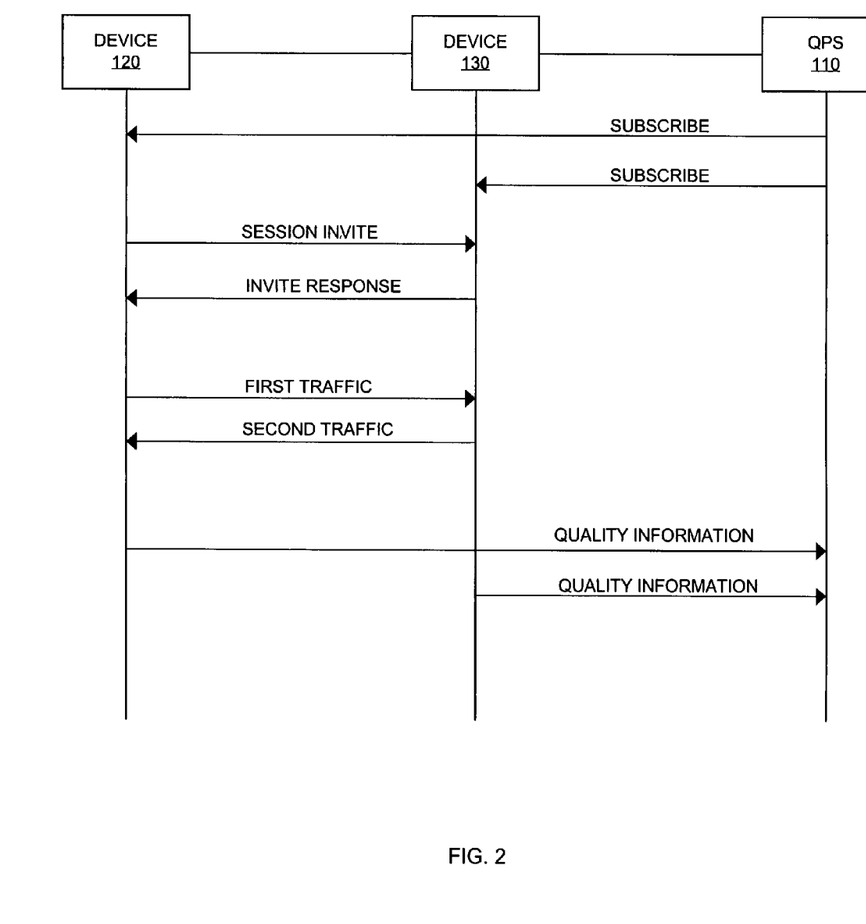
FIG. 2 illustrates the operation of a communication system in an embodiment of the invention.

FIGS. 1 and 2

FIG. 1 illustrates communication system 100 in an embodiment of the invention. Communication system 100 includes device 120, device 130, quality processing system 110 (QPS), and routing system 105. Device 120 communicates with device 130 in a conventional manner over routing system 105. Similarly, devices 120 and 130 communicate with QPS 110 in a conventional manner. Routing system 105 includes nodes 101, 102, and 103.

Routing system 105 could be any system capable of routing packet communications amongst the elements of communication system 100. Nodes 101, 102, and 103 could be any type of network node, such as a router or a packet switch. Nodes 101, 102, and 103 could also be other types of nodes, such as gateways. Device 120 could be any type of device capable of transmitting and receiving communications. For instance, device 120 could be an end device, such as a phone, a personal computing device, or a multi media device. Device 120 could also be an intermediate device, such as a gateway. Device 120 could also be an access point, such as a wireless base station transceiver. Quality processing could be any type of system capable of transmitting and receiving messages with devices 120 and 130.

In operation, device 120 exchanges session communications with device 130 for a session. A session could be, for example, a voice or video over packet (VoP) session. Such sessions could occur in accordance with very well known protocols, such as the Internet protocol (IP) and voice over IP (VoIP), as well as other protocols. Furthermore, other well known control protocols, such as the session initiation protocol (SIP) and real-time control protocol (RTCP) could be used for control aspects of sessions. In an advance over the prior art, device 120 is capable of providing quality information to QPS 110 related to sessions between device 120 and device 130. Similarly, device 130 is also capable of providing quality information to QPS 110. It should be noted that both device 120 and device 130 could be end devices, such as phones, or intermediate devices, such as gateways.

FIG. 2 illustrates the operation of communication network 100 in an embodiment of the invention for collecting and correlating quality information for a session over a path between an origination node and a destination node. In this case, the origination node is device 120 and the destination node is device 130. The session path traverses routing system 105.

To begin, QPS 110 subscribes to quality information produced by device 120 by transmitting a subscribe message identifying device 120. Routing system 105 routes the message to device 120. Device 120 receives the subscribe message. QPS 110 could optionally transmit an additional subscribe message identifying device 130. In turn, device 130 would receive the subscribe message. When desired, a session is initiated between device 120 and device 130 when device 120 transmits a session invite message to device 130. In response to the invitation, device 130 transmits an invitation response to device 120. After the session setup process has been completed, traffic is exchanged for the session. Device 120 transmits first traffic for the session to device 130, and device 130 transmits second traffic for the session to device 130. In an alternative, the session could be a one-way session, such as a video or music stream transmitted to device 120 by a video application server. In such a case, device 120 would receive traffic but not send it.

During the session, device 120 monitors and measures the second traffic sent by device 130 to determine quality information related to the session. For instance, device 120 could measure jitter, as well as other quality metrics. Responsive to the subscribe message sent by QPS 110, device 120 transmits a quality message to QPS 110 indicating the quality information. Also during the session, device 130 monitors and measures the first traffic sent by device 130 to determine quality information related to the session, such as jitter. Responsive to the other subscribe message sent by QPS 110, device 130 transmits a quality message to QPS 110 indicating the quality information.

As illustrated, communication system 100 provides for delivering session quality information to network elements not directly participating on a session. In particular, FIG. 2 illustrates a session between device 120 and device 130. Quality information that is routinely generated by devices 120 and 130 is delivered in a seamless fashion to QPS 110. Importantly, QPS 110 subscribes to the quality information prior to the initiation of the session between device 120 and 130. This allows QPS 110 to determine on a case by case basis which sessions or which devices it is desirable to monitor. Furthermore, this allows for the secure delivery of quality information to QPS 110, as opposed to less secure broadcast mechanisms.

Second Embodiment Configuration and Operation

Figure 3:
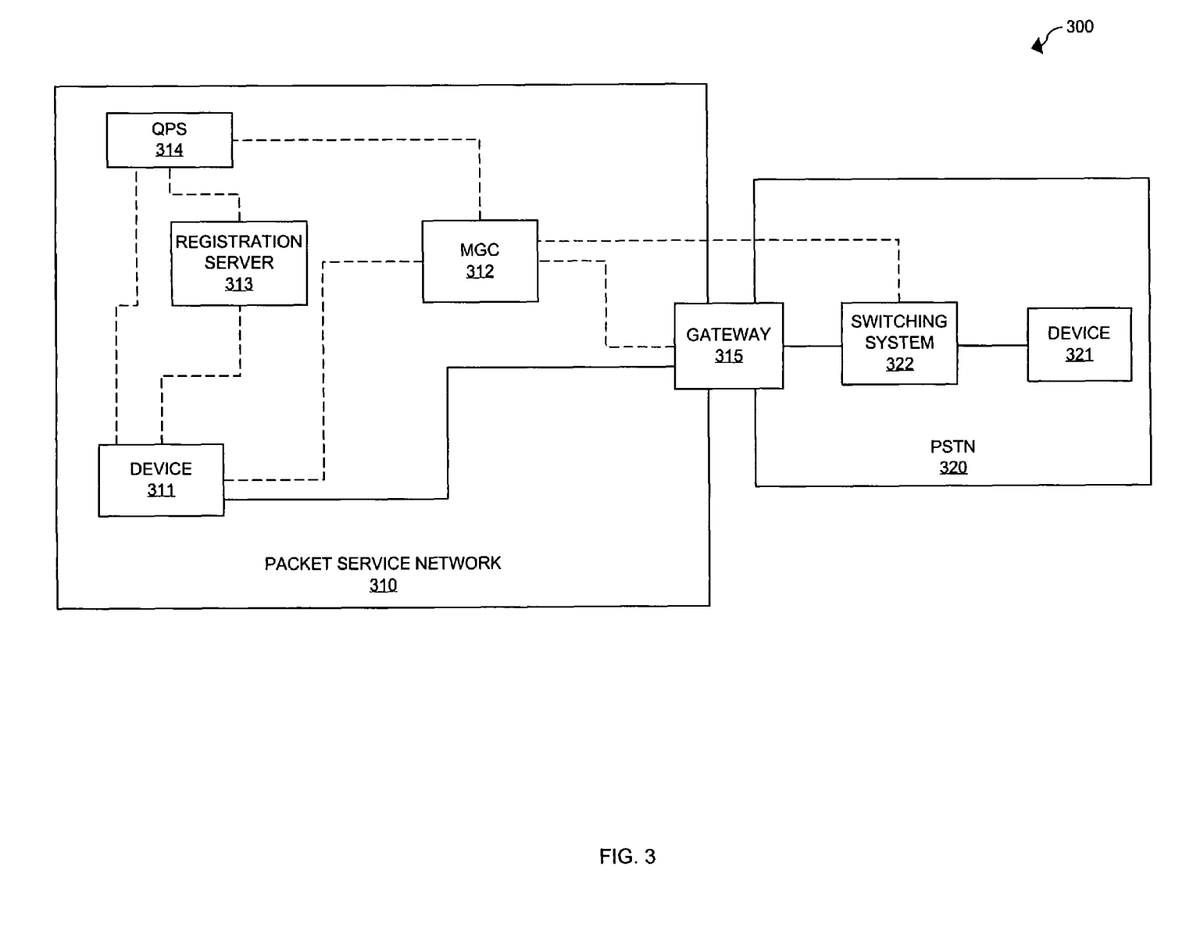
FIG. 3 illustrates a communication system in an embodiment of the invention.
Figure 4:
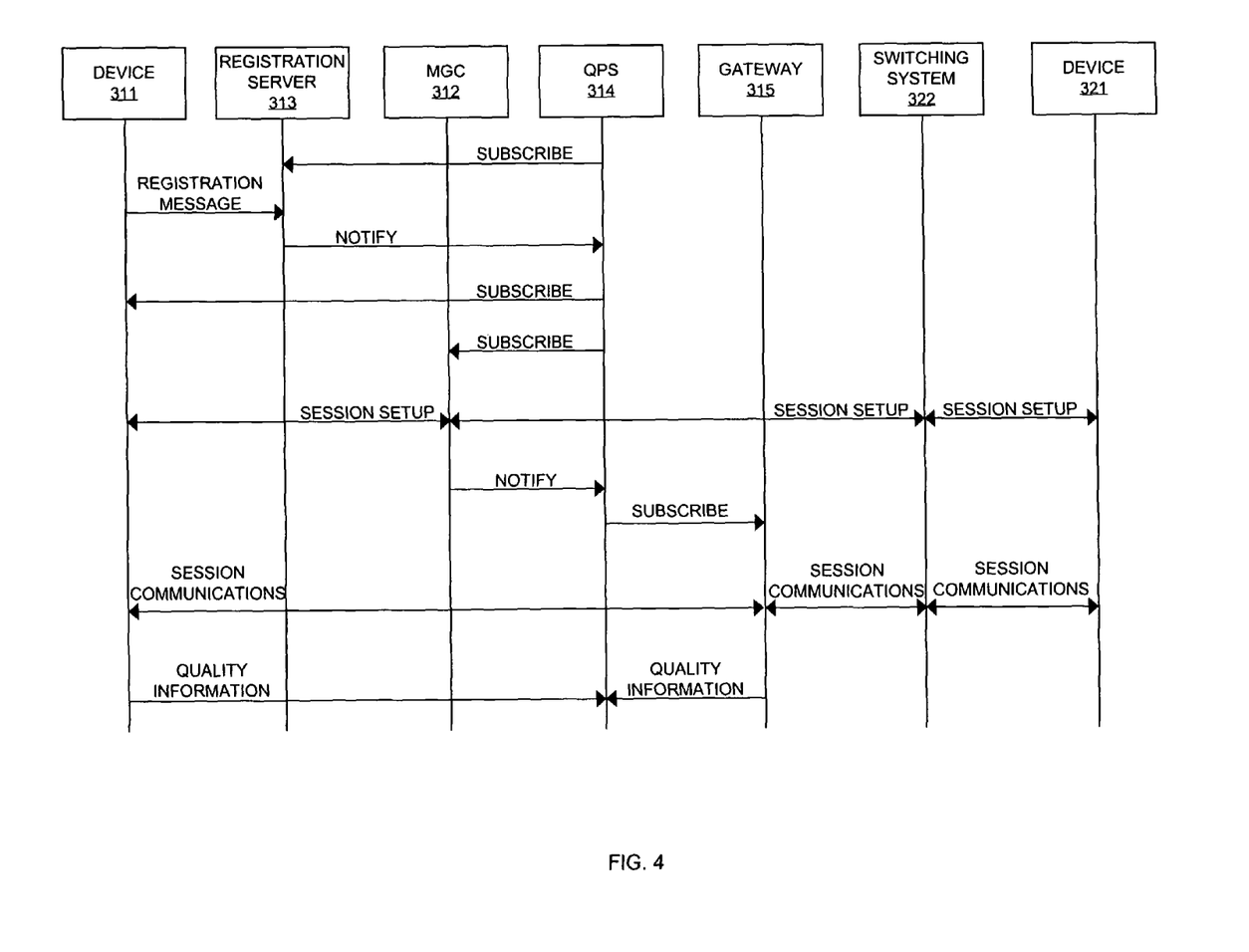
FIG. 4 illustrates the operation of a communication system in an embodiment of the invention.

FIGS. 3 and 4

FIG. 3 illustrates communication system 300 in an embodiment of the invention. Communication system 300 includes packet service network 310 operatively coupled to public switched telephone network (PSTN 320). Gateway 315 couples network 310 to network 320. Network 310 includes device 311, media gateway controller (MGC) 312, registration server 313, and quality processing system (QPS) 314. PSTN 320 includes switching system 322 and device 321.

Packet service network 310 could be any packet based network for the provisioning and transport of packet communications. Device 311 could likewise be any device capable of operating in packet service network 310, such as a VoIP enabled phone. MGC 312 is any processing system capable of controlling gateway 315 and performing call processing operations in packet service network 310. The solid lines illustrated in FIG. 3 are intended to represent user communications, such as voice or video traffic. The dashed lines are intended to represent control communications, such as control messages or call signaling. Packet service network 310 could include other elements, such as routers or packet switches that are not shown for purposes of clarity.

In this embodiment, device 311 is configured to participate on a voice call session with device 321. In this embodiment, device 311 transmits voice communications in a packet format to gateway 315. Gateway 315 is configured to interwork the communications to a time division multiplexed format (TDM) and to send the TDM communications to switching system 322. Switching system 322 is configured to route the communications to device 321. In the opposition direction, TDM voice communications are sent by device 321 to switching system 322. Switching system 322 routes the TDM communications to gateway 315. Gateway 315 interworks the TDM communications to a packet format and transmits the packet communications to device 311.

At any point during a session, device 311 and gateway 315 are capable of generating quality information related to the quality of service of a session. For instance, device 311 is capable of monitoring the RF signaling strength during a session, in the case of wireless communications. Similarly, gateway 315 can monitor session characteristics, such as jitter, to determine quality of service levels. Other quality characteristics and metrics are possible. Either during or after a session, quality messages carrying information related to quality of service can be exchanged between devices. Well known protocols for exchanging quality of service information include RTCP.

Prior to and during the session, registration server 313 provides registration functions for devices operating in packet service network 310. Registration server 313 could be, for example, a SIP registration server. MGC 312 provides session control services, such as inter-network call control and gateway selection. In an advantage over the prior art, QPS 314 primes the elements of communication system 300 to provide quality information to QPS 314.

FIG. 4 illustrates the operation of communication system 300 in an embodiment of the invention involving a voice session between device 311 and device 321 whereby QPS 314 primes device 311 and gateway 315 to deliver quality of service information for a session. Furthermore, device 311 and gateway 315 provide the information during the session.

It should be understood that several protocols could be used to implement a session in communication system 300. For example, device 311 could be a SIP phone and the session could be a VoIP session. Importantly, the subscribe and notification processes could be implemented using SIP messaging schemes. The quality information could pertain to layer 3 quality, such as packet loss or jitter. Additionally, the quality information could contain to other layer quality, such as wireless radio frequency (RF) quality, in the case of wireless communications. It should also be understood that SIP is often times implemented in conjunction with SDP. Other well known protocols, such as H.323, could be used to implement a session communication system 300.

Currently, SIP includes several methods well known in the art, including ACK, BYE, CANCEL, INFO, INVITE, NOTIFY, OPTIONS, PRACK, PUBLISH, REGISTER, SUBSCRIBE, UPDATE MESSAGE, AND REFER. The ACK method acknowledges the establishment of a session. The BYE method terminates a session. The CANCEL method cancels a pending request. The INFO method transports PSTN telephony signaling. The INVITE method establishes a session. The NOTIFY message notifies a user agent about a particular event. The OPTIONS method queries a server about its capabilities. The PRACK method acknowledges the reception of a provisional response. The PUBLISH method uploads information to a server. The REGISTER methods maps a public URI with the current locations of a user. The SUBSCRIBE method is a request to other elements by one element to be notified about a particular event. The MESSAGE method carries an instant message. The REFER method instructs a server to sent a request.

Referring to FIG. 4, QPS 314 transmits a subscribe message to registration server 313. As discussed above, registration server 313 handles conventional registration operations. Thus, when devices, such as device 311, come online, they register their presence with registration server 313. As part of the registration process, registration server 313 can provide a dynamic address for the registered devices. The subscribe message sent from QPS 314 to registration server 313 informs registration server 313 that QPS 314 wants to be informed of any new device registrations. Therefore, when device 311 sends a registration message to registration server 313, registration server 313 responsively transmits a notification message to QPS 314 indicating the identity of device 311. The identity could be indicated in a number of conventional ways, such as network address or SIP address.

Once QPS 314 has been notified of the registration of device 311, QPS 314 transmits another subscribe message. This time, the subscribe message specifically identifies device 311. The subscribe message also indicates that QPS 314 wants session quality information related to sessions device 311 will participate on. QPS 314 also transmits a subscribe message to MGC 312 indicating the identify of device 311. This subscribe message also indicates that QPS 314 wants quality information pertaining to sessions involving device 311.

At this point in the process, a session has not yet been initiated. Rather, the groundwork has been laid for QPS 314 to have the ability to later collect and correlate session quality information. Namely, device 311 is primed to deliver quality information to QPS 314.

Next, a session is setup between device 321 and device 311. This could occur in a number of different ways. For instance, a user could originate a call from device 311. Alternatively, a user could originate a call from device 321. Regardless, MGC 312 and switching system 322 broker the call as is well known in the art. Switching system 322 could exchange SS7 signaling with MGC 312 containing call setup information. MGC 312 would then select gateway 315 for the call and create a session ID for the session. Device 311 would be provided the address for gateway 315 and the session ID.

Once gateway 315 has been selected, MGC 312 transmits a notification message to QPS 314 indicating the selected gateway 315 and the session ID. This notification message is responsive to the subscribe message earlier sent to MGC 312 by QPS 314. QPS 314 receives the notification message and responsively transmits a new subscribe message to gateway 315. This subscribe message indicates the session ID for the looming session between device 311 and device 321. This subscribe message also indicates that QPS 314 has requested quality information for the session.

At this point in the process, the session has been initiated. In addition, device 311 has been primed to deliver quality information for the session to QPS 314. Furthermore, gateway 315 has been primed to deliver quality information for the session to QPS 314. Once session communications have commenced, device 311 monitors and measures the communications to generate quality information. Similarly, gateway 315 monitors and measures the communications to generate quality information. Either periodically or intermittently, device 311 transmits quality message to QPS 314 indicating the quality information. Likewise, gateway 315 transmits similar quality messages indicating quality information.

Device 311 could be configured to run a modified version of SIP having a new QUALITY method. The quality method would obtain the quality information generated by device 311 via another protocol, such as RTCP. The quality information would then be packaged into a quality message and sent to QPS 314. Gateway 315 could be configured in a like manner. The NOTIFY method could be used to transport the quality information. Similarly, the MESSAGE method could be used to transport the quality information. Alternatively, the OPTIONS method could be utilized to allow two devices—i.e. device 311 and QPS 314—to negotiate the exchange of quality information. The OPTIONS method could also be utilized to negotiate which specific quality metrics or characteristics are included with the quality information.

Computer System

Figure 5:
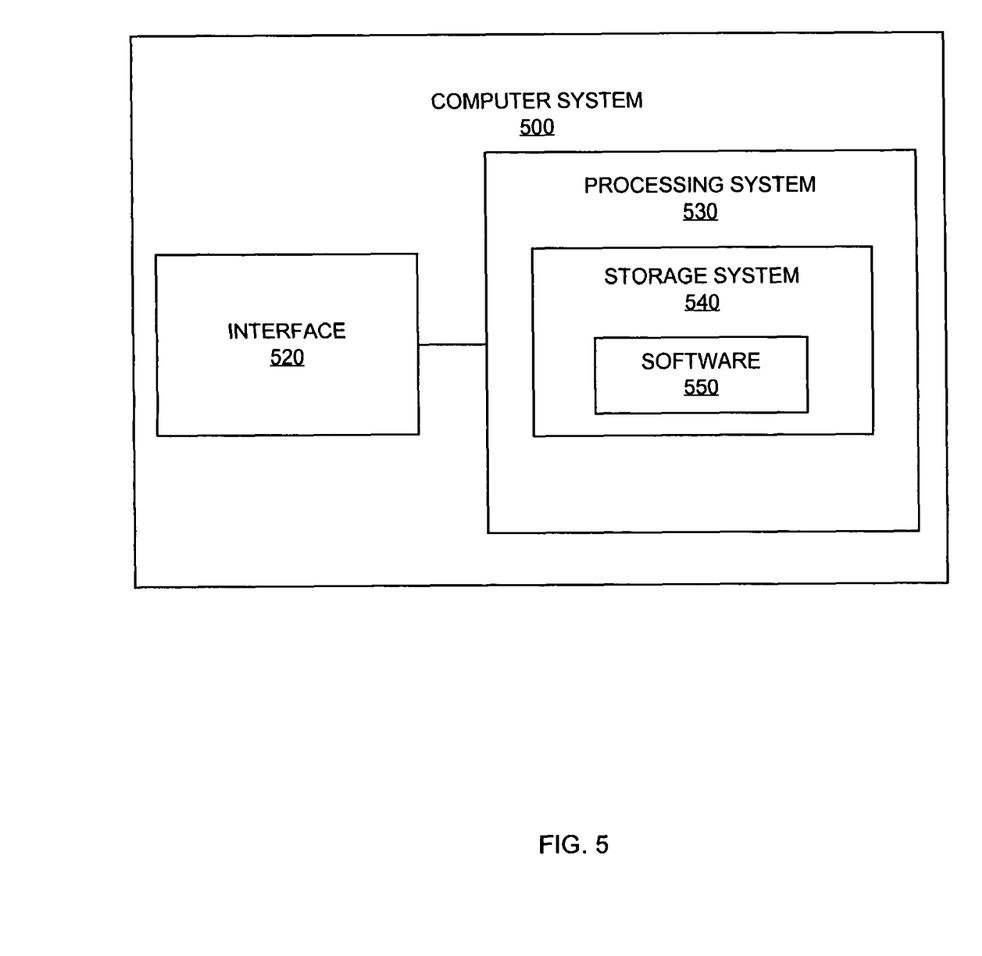
FIG. 5 illustrates a computer system in an embodiment of the invention.

FIG. 5 illustrates computer system 500 in an embodiment of the invention. Computer system 500 includes interface 520, processing system 530, storage system 540, and software 550. Storage system 540 stores software 550. Processing system 530 is linked to interface 520. Computer system 500 could be comprised of a programmed general-purpose computer, although those skilled in the art will appreciate that programmable or special purpose circuitry and equipment may be used. Computer system 500 may use a client server architecture where operations are distributed among a server system and client devices that together comprise elements 520-550.

Interface 520 could comprise a network interface card, modem, port, or some other communication device. Signaling interface 520 may be distributed among multiple communication devices. Interface 530 could comprise a computer microprocessor, logic circuit, or some other processing device. Processing system 530 may be distributed among multiple processing devices. Storage system 540 could comprise a disk, tape, integrated circuit, server, or some other memory device. Storage system 540 may be distributed among multiple memory devices.

Processing system 530 retrieves and executes software 550 from storage system 540. Software 550 may comprise an operating system, utilities, drivers, networking software, and other software typically loaded onto a general-purpose computer. Software 550 could also comprise an application program, firmware, or some other form of machine-readable processing instructions. When executed by the processing system 530, software 550 directs processing system 530 to operate as described for the elements of communication systems 100 and 300, including QPS 110 and QPS 314.

What is claimed is:

1. A communication system for collecting and correlating quality information for sessions over a path between an origination node and a destination node, the communication system comprising:
    a quality processing system configured to transmit a first subscribe message in a first protocol to a registration system, wherein the first subscribe message requests the registration system to inform the quality processing system of any new device registrations;
    the registration system configured to receive a first registration notification message in the first protocol from a first device to register the first device and transmit a first registration identification message in the first protocol identifying the first device responsive to the first subscribe message;
    the quality processing system further configured to transmit a second subscribe message in the first protocol to the first device, wherein the second subscribe message requests the first device to provide the quality processing system with session quality information related to sessions the first device will participate on; and
    the first device configured to receive the second subscribe message, process first traffic for a session to determine first quality information, wherein the first quality information is determined from first quality information messages generated in a second protocol, and transmit a first quality message in the first protocol indicating the first quality information to the quality processing system responsive to the second subscribe message, wherein the first quality message contains the first quality information determined from the first quality information messages.

2. The communication system of claim 1 wherein the first protocol comprises a Session Initiation Protocol (SIP) and wherein the second protocol comprises a Real-time Transport Control Protocol (RTCP).

3. The communication system of claim 1 further comprising a second device wherein the registration system is further configured to receive a second registration notification message in the first protocol from the second device to register the second device and transmit a second registration identification message in the first protocol identifying the second device responsive to the first subscribe message;
    the quality processing system is further configured to transmit a third subscribe message in the first protocol to the second device, wherein the third subscribe message requests the second device to provide the quality processing system with session quality information related to sessions the second device will participate on; and
    wherein the second device is configured to receive the third subscribe message, process second traffic for the session to determine second quality information, wherein the second quality information is determined via second quality information messages in the second protocol, and transmit a second quality message in the first protocol indicating the second quality information to the quality processing system responsive to the third subscribe message, wherein the second quality message contains the second quality information determined from the second quality information messages.

4. The communication system of claim 3 wherein the first device comprises the origination node, wherein the second device comprises the destination node, wherein the first protocol comprises a Session Initiation Protocol (SIP), and wherein the second protocol comprises a Real-time Transport Control Protocol (RTCP).

5. The communication system of claim 1 wherein the first device comprises an intermediate node of the path.

6. The communication system of claim 1 wherein the first device comprises a voice over packet enabled end device and wherein the session comprises a voice over packet session.

7. A method of operating a communication system for collecting and correlating quality information for sessions over a path between an origination node and a destination node, the method comprising:
    in a quality processing system, transmitting a first subscribe message in a first protocol to a registration system, wherein the first subscribe message requests the registration system to inform the quality processing system of any new device registrations;
    in the registration system, receiving a first registration notification message in the first protocol from a first device to register the first device and transmit a first registration identification message in the first protocol identifying the first device responsive to the first subscribe message;
    in the quality processing system, transmitting a second subscribe message in the first protocol to the first device, wherein the second subscribe message requests the first device to provide the quality processing system with session quality information related to sessions the first device will participate on; and
    in the first device, receiving the second subscribe message, processing first traffic for a session to determine first quality information, wherein the first quality information is determined from first quality information messages generated in a second protocol, and transmitting a first quality message in the first protocol indicating the first quality information to the quality processing system responsive to the second subscribe message, wherein the first quality message contains the first quality information determined from the first quality information messages.

8. The method of claim 7 wherein the first protocol comprises a Session Initiation Protocol (SIP) and wherein the second protocol comprises a Real-time Transport Control Protocol (RTCP).

9. The method of claim 7 further comprising, in the registration system, receiving a second registration notification message in the first protocol from a second device to register the second device and transmitting a second registration identification message in the first protocol identifying the second device responsive to the first subscribe message, in the quality processing system, transmitting a third subscribe message in the first protocol to the second device, wherein the third subscribe message requests the second device to provide the quality processing system with session quality information related to sessions the second device will participate on, and, in the second device, receiving the third subscribe message, processing second traffic for the session to determine second quality information, wherein the second quality information is determined via second quality information messages in the second protocol, and transmitting a second quality message in the first protocol indicating the second quality information to the quality processing system responsive to the third subscribe message, wherein the second quality message contains the second quality information determined from the second quality information messages.

10. The method of claim 9 wherein the first device comprises the origination node, wherein the second device comprises the destination node, wherein the first protocol comprises a Session Initiation Protocol (SIP), and wherein the second protocol comprises a Real-time Transport Control Protocol (RTCP).

11. The method of claim 7 wherein the first device comprises an intermediate node of the path.

12. The method of claim 7 wherein the first device comprises a voice over packet enabled end device and wherein the session comprises a voice over packet session.

13. A quality processing system for collecting and correlating quality information for sessions over a path between an origination node and a destination node, the quality system comprising:
a processing system; and
an interface;
wherein the processing system is configured to generate a first subscribe message in a first protocol identifying a registration system, wherein the first subscribe message requests the registration system to inform the processing system of any new device registrations;
wherein the interface is configured to transmit the first subscribe message to the registration system and receive a registration identification message in the first protocol from the registration system identifying a first device;
wherein the processing system is further configured to process the registration identification message to generate a second subscribe message in the first protocol identifying the first device wherein the second subscribe message requests the first device to provide the quality processing system with session quality information related to sessions the first device will participate on;
wherein the interface is further configured to transmit the second subscribe message to the first device, and receive a first quality message in the first protocol indicating first quality information transmitted by the first device responsive to the second subscribe message wherein the first device processes first quality information messages generated in a second protocol to determine the first quality information.

14. The quality processing system of claim 13 wherein the first device comprises the origination node.

15. The quality processing system of claim 13 wherein the first device comprises an intermediate node of the path.

16. The quality processing system of claim 13 wherein the first device comprises a voice over packet enabled end device and wherein the sessions comprises a voice over packet session.

17. The communication system of claim 13 wherein the first protocol comprises a Session Initiation Protocol (SIP), and wherein the second protocol comprises a Real-time Transport Control Protocol (RTCP).

18. A non-transitory computer-readable medium encoded with computer instructions which when executed cause the computer to perform a method of operating a quality processing system for collecting and correlating quality information for sessions over a path between an origination node and a destination node, the method comprising:
generating a first subscribe message in a first protocol identifying a registration system, wherein the first subscribe message requests the registration system to inform the processing system of any new device registrations, transmitting the first subscribe message to the registration system and receive a registration identification message in the first protocol from the registration system identifying a first device, processing the registration identification message to generate a second subscribe message in the first protocol identifying the first device, wherein the second subscribe message requests the first device to provide the quality processing system with session quality information related to sessions the first device will participate on, transmitting the second subscribe message to the first device, and receiving a first quality message in the first protocol indicating first quality information transmitted by the first device responsive to the second subscribe message wherein the first device processes first quality information messages generated in a second protocol to determine the first quality information.

19. The non-transitory computer-readable medium of claim 18 wherein the first protocol comprises a Session Initiation Protocol (SIP), and wherein the second protocol comprises a Real-time Transport Control Protocol (RTCP).

* * * * *